(12) United States Patent
Franco

(10) Patent No.: US 9,227,645 B2
(45) Date of Patent: Jan. 5, 2016

(54) MODULAR CUSTOMIZABLE CART

(76) Inventor: Juan Franco, Reno, NV (US)

(*) Notice: Subject to any disclaimer, the term of this patent is extended or adjusted under 35 U.S.C. 154(b) by 103 days.

(21) Appl. No.: 13/481,269

(22) Filed: May 25, 2012

(65) Prior Publication Data

US 2013/0313029 A1 Nov. 28, 2013

(51) Int. Cl.
| | |
|---|---|
| *B62B 3/02* | (2006.01) |
| *B62B 3/00* | (2006.01) |
| *B60K 7/00* | (2006.01) |
| *B62B 5/00* | (2006.01) |
| *B62B 5/08* | (2006.01) |

(52) U.S. Cl.
CPC .............. *B62B 3/002* (2013.01); *B60K 7/0007* (2013.01); *B62B 3/02* (2013.01); *B62B 5/0079* (2013.01); *B62B 5/087* (2013.01); *B60K 2007/0038* (2013.01); *B60K 2007/0092* (2013.01); *B60Y 2200/62* (2013.01); *B62B 2202/66* (2013.01); *B62B 2207/02* (2013.01); *Y10T 29/49826* (2015.01)

(58) Field of Classification Search
CPC .... B62B 3/02; B62B 3/1476; B62B 2203/04; B62B 2203/74; B62B 3/08
USPC .......................... 280/79.3, 79.2, 491.1, 491.4
See application file for complete search history.

(56) References Cited

U.S. PATENT DOCUMENTS

| | | | | |
|---|---|---|---|---|
| 2,116,312 | A * | 5/1938 | Hollett | 280/79.2 |
| 2,903,219 | A * | 9/1959 | Ingham, Jr. | 248/137 |
| 3,330,611 | A | 7/1967 | Heifetz | |
| 4,193,161 | A * | 3/1980 | Scott | 15/352 |
| 4,505,495 | A * | 3/1985 | Foss et al. | 280/651 |
| 4,515,518 | A * | 5/1985 | Gilbert et al. | 414/459 |
| 5,040,809 | A * | 8/1991 | Yang | 280/42 |
| 5,040,811 | A | 8/1991 | Busken et al. | |
| 5,145,311 | A * | 9/1992 | Salvucci | 414/592 |
| 5,454,625 | A * | 10/1995 | Christensen et al. | 298/18 |
| 5,503,424 | A | 4/1996 | Agopian | |
| 5,845,915 | A * | 12/1998 | Wilson | 280/47.19 |
| 5,876,047 | A * | 3/1999 | Dennis | 280/47.35 |
| 5,915,723 | A | 6/1999 | Austin | |
| 5,934,694 | A * | 8/1999 | Schugt et al. | 280/33.991 |
| D425,279 | S | 5/2000 | Houry et al. | |
| 6,866,463 | B2 * | 3/2005 | Riordan et al. | 414/498 |
| 6,880,652 | B2 * | 4/2005 | Holtan et al. | 180/19.2 |
| 7,014,199 | B2 * | 3/2006 | Hendzel | 280/47.35 |
| 7,104,556 | B1 * | 9/2006 | Young | 280/47.35 |
| 7,111,852 | B2 | 9/2006 | Woods et al. | |
| 7,648,147 | B2 * | 1/2010 | Lauer et al. | 280/47.35 |
| 7,806,646 | B2 * | 10/2010 | Riordan et al. | 414/498 |
| 7,849,943 | B1 * | 12/2010 | Ragland | 180/19.2 |
| 8,167,254 | B2 * | 5/2012 | Hopkins | 248/137 |
| 8,360,459 | B2 * | 1/2013 | Holtan et al. | 280/495 |

(Continued)

*Primary Examiner* — Katy M Ebner
*Assistant Examiner* — Emma K Frick
(74) *Attorney, Agent, or Firm* — Kerr IP Group, LLC; Michael A. Kerr

(57) ABSTRACT

A modular cart that includes a main cart, a first modular cart frame, and a second modular cart frame is described. The main cart further includes a handle end with a first base component that is mechanically coupled to at least one caster. The main cart also includes a first bar disposed on a distal end of the first base component that extends to a second base component, in which the first bar is orthogonal to the second base component and the first base component. A first bay perimeter is bounded by the first base component, the first bar and the second base component. The main cart further includes a second bay perimeter is bounded by a second base component, a second bar and a third base component.

16 Claims, 8 Drawing Sheets

(56) References Cited

U.S. PATENT DOCUMENTS

| | | | |
|---|---|---|---|
| 8,540,255 B2* | 9/2013 | Young | 280/47.35 |
| 8,590,921 B2* | 11/2013 | Benson et al. | 280/656 |
| 2004/0056439 A1* | 3/2004 | Arceta et al. | 280/47.34 |
| 2005/0206282 A1* | 9/2005 | Walburn | 312/312 |
| 2007/0062891 A1* | 3/2007 | Stievenard | 211/59.2 |
| 2008/0302585 A1 | 12/2008 | Perelli et al. | |
| 2009/0166999 A1 | 7/2009 | Mason et al. | |
| 2010/0066045 A1* | 3/2010 | Presnell et al. | 280/47.18 |
| 2010/0129184 A1 | 5/2010 | Thogersen | |
| 2011/0017744 A1 | 1/2011 | Sandhu | |

* cited by examiner

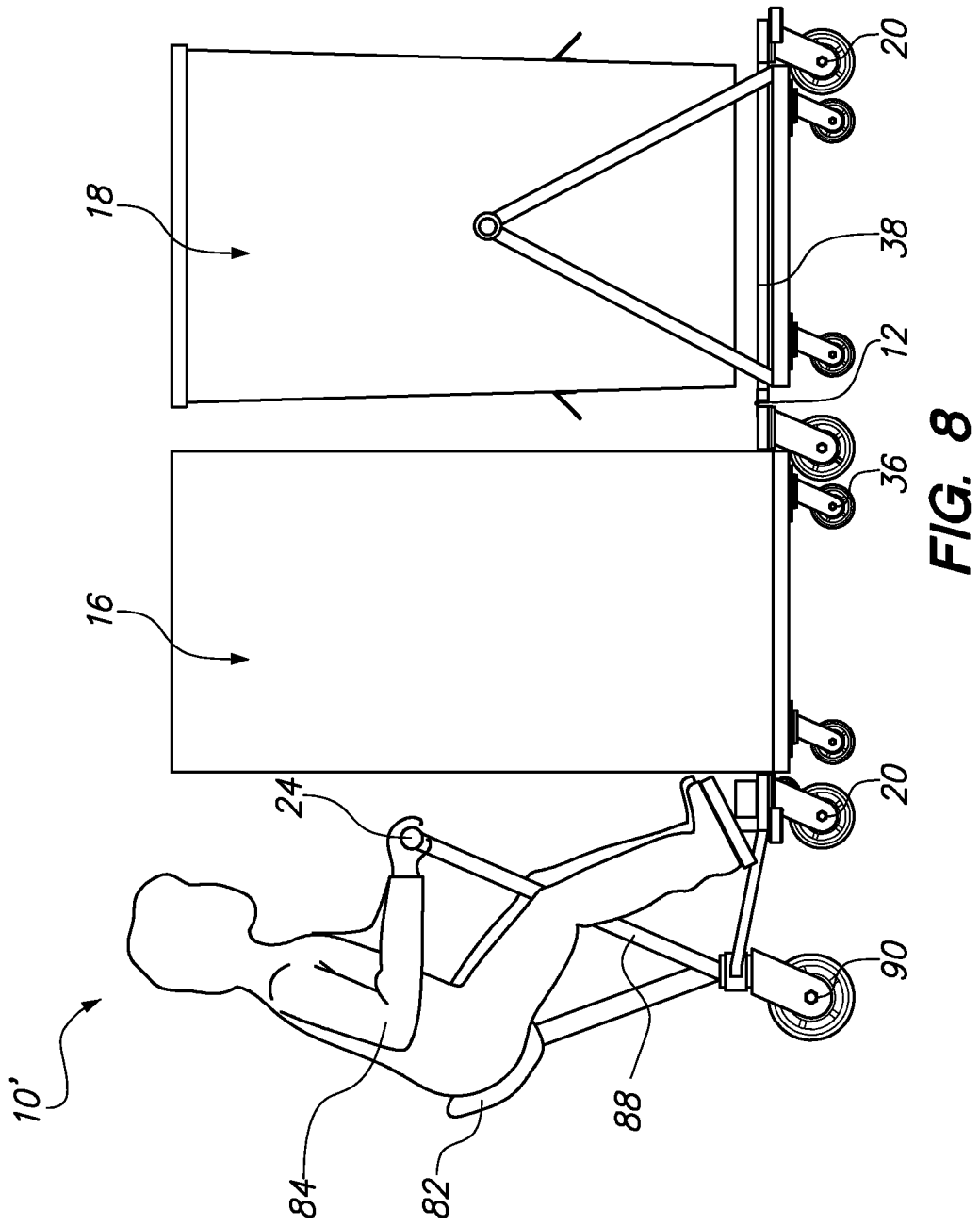

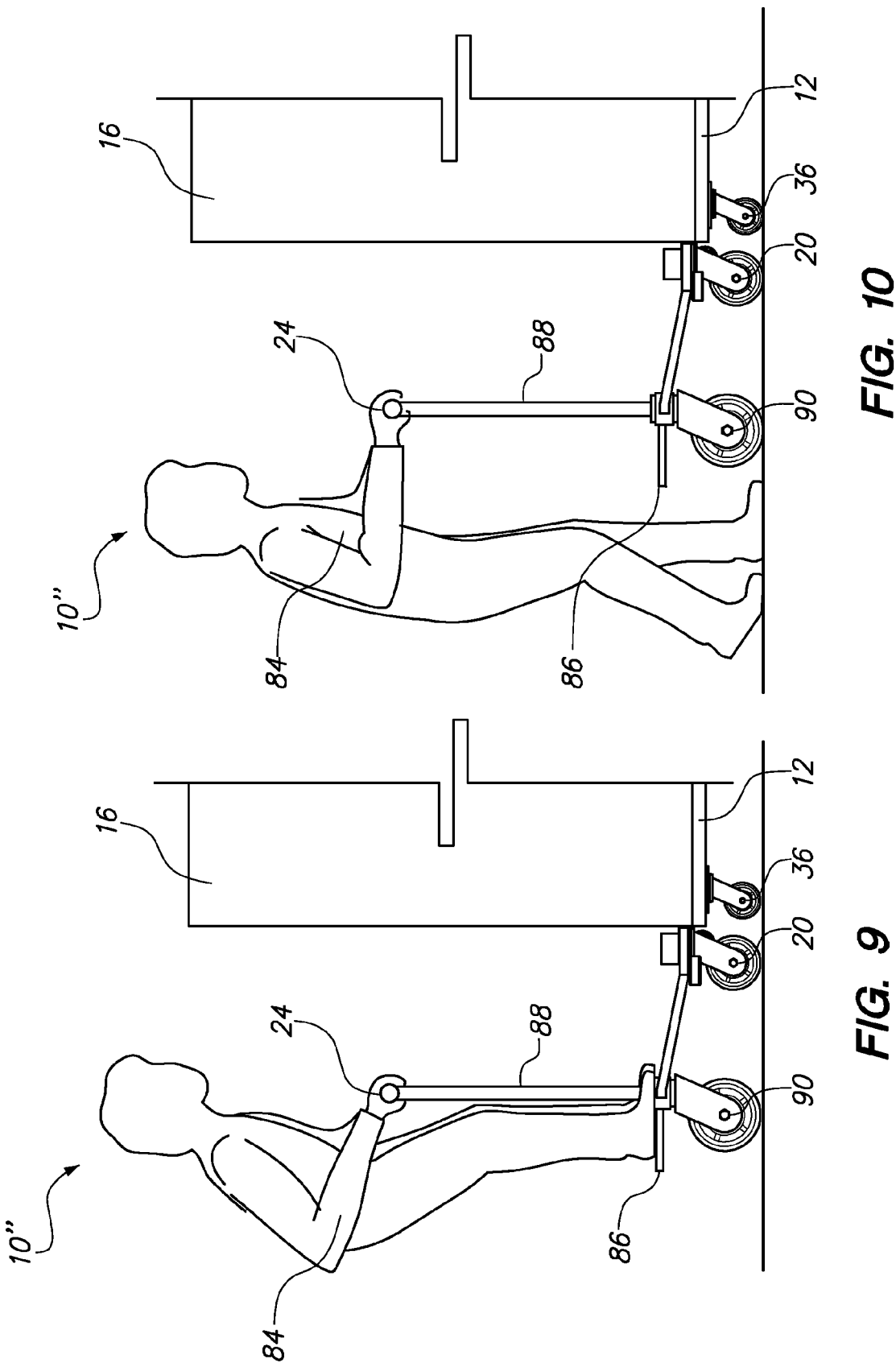

MODULAR CUSTOMIZABLE CART

FIELD OF THE INVENTION

The present invention relates to a customizable cart having modular elements. More specifically, the invention relates to a customizable cart with modular elements that enable the cart to be used as a utility cart, a laundry cart, and a customizable housekeeping cart.

BACKGROUND

Carts come in different shapes and sizes such as platform trucks, utility carts, two-shelf carts or the like. Carts are generally designed for a particular purpose, and that purpose is relatively limited, so multiple carts are purchased at a great expense. For example, carts are used for transporting a variety of materials in a wide variety of environments such as warehousing, maintenance, housekeeping, and construction.

A first illustrative cart is the laundry carts that may include an attached fabric linen bag for stowing dirty towels and bed sheets. The laundry cart may be a dedicated cart that is just used to capture dirty linens.

Another illustrative cart is the utility cart. This type of cart includes at least one shelf and a handle at one or both ends for pushing or pulling the cart. In addition to transporting material, the top shelf of the cart may be used as a work surface.

Yet another illustrative cart is the housekeeping or "maid" cart that is constructed for room make-up and linen changes. The maid cart may include linen bags that are suspended within the handles of the carts, in which the housekeeper can place dirty linens. In addition to the linen bag, the housekeeping cart may include supplies that are used to clean multiple rooms, as well as clean towels, clean linens, amenities such as soaps and shampoos, and a trash bag used to collect waste from the waste baskets. The fully loaded housekeeping cart is then pushed by the housekeeper along a predetermined route.

SUMMARY

A modular cart that includes a main cart, a first modular cart frame, and a second modular cart frame is described. The main cart further includes a handle end with a first base component that is mechanically coupled to at least one caster. The main cart also includes a first bar disposed on a distal end of the first base component that extends to a second base component, in which the first bar is orthogonal to the second base component and the first base component. A first bay perimeter is bounded by the first base component, the first bar and the second base component. The main cart further includes a second bar disposed on a distal end of the second base component that extends to a third base component, in which the second bar is orthogonal to the second base component and the third base component. A second bay perimeter is bounded by the second base component, the second bar and the third base component.

The main cart is configured to interface with a first modular cart frame having a plurality of first casters disposed on a first modular cart frame base. In the illustrative embodiment the first modular cart frame is configured to slidably interface with the main cart frame at the first bay.

In the illustrative embodiment, the main cart is also configured to interface with a second modular cart frame having a plurality of second casters on a second modular cart frame base. In the illustrative embodiment, the second modular cart is configured to slidably interface with the main cart frame at the second bay.

The modular cart also includes a pivot disposed on the second base component that enables the second bar and the third base component to rotate, so that the second bar and third base component can be folded over so that the first base component can interface with the third base component.

The modular cart may also include a rigid material configured to be interface with the surface of the first base component, the first bar, the second base component, the second bar and the third base component, wherein the rigid material enable the module cart to operate as a utility cart.

In another illustrative embodiment, one of the modular cart frames includes a bag that enables the modular cart frame to be used, for example, as a laundry cart. Additionally, the modular cart frame with the bag may also include a pivoting laundry receptacle.

In yet another embodiment, one of the module cart frames includes a plurality of shelves. By way of example and not of limitation, the at least one of the plurality of shelves further comprises an articulating shelf. Additionally, at least one of the shelves may be configured to be removable. Furthermore, the modular cart may also include at least one slidable door.

There are various embodiments of the modular cart, in which both bays interface with modular cart frames. For example, the first modular cart frame includes a bag and the second modular cart frame includes a plurality of shelves. In another illustrative example, the first modular cart frame further comprises a first bag and the second modular cart frame further comprises a second bag. In yet another illustrative embodiment, the first modular cart frame includes a first plurality of shelves and the second modular cart frame includes a second plurality of shelves.

Furthermore, a motorized embodiment of the main cart is described that includes a motor configured to power the modular cart. Further yet, a steerable embodiment is presented that includes a steerable shaft, an operator seat and a support plate.

A cart system that includes a multipurpose cart frame and at least one cart removably coupled to the multipurpose cart frame is described. The multipurpose cart frame further includes at least two bays and a plurality of cart frame casters that are fixedly coupled to the multipurpose cart frame. Additionally, at least one cart is removably coupled to the multipurpose frame and is selected from the modular cart group consisting of a closet cart and a laundry container. The closet cart has a plurality of shelves and a base that is fixedly coupled to a plurality of casters. The laundry container is fixedly coupled to a base that is fixedly coupled to a plurality of casters.

In the illustrative cart system, the multipurpose frame includes at least two closet carts. In another illustrative cart system, the multipurpose frame includes at least two laundry containers. In yet another illustrative cart system, a motor is coupled to the multipurpose cart frame and configured to electronically mobilize the multipurpose cart. The motorized cart system may also include a steerable shaft and a seat or a support plate.

A method of forming a customizable cart system is also described. The method comprises selecting at least one of a closet cart or a laundry cart. The closet cart has shelves and a base that is fixedly coupled to casters. The laundry cart includes a laundry receptacle fixedly coupled a base that is fixedly coupled to casters. The method then proceeds to couple at least one closet cart and laundry cart to a multipurpose cart frame having a plurality of casters and configured for receiving at least one of the at least one closet cart and laundry cart.

In one embodiment, the method includes selecting at least two closet carts. In another embodiment, the method includes selecting at least two laundry carts. In yet another embodiment, the method includes sliding the at least one closet cart and laundry cart into a bay configured to receive the at least one closet cart and laundry cart. In still another embodiment, the method includes coupling a modular cart to a motorized multipurpose cart frame.

DRAWINGS

The present invention will be more fully understood by reference to the following drawings which are for illustrative, not limiting, purposes.

FIG. 1 shows an illustrative customizable cart with a laundry cart module and a first illustrative closet cart module with multiple shelves.

FIG. 2 presents an isometric view of a foldable "mother" cart frame without any modular elements.

FIG. 3 presents an isometric view of an illustrative utility cart embodiment that includes a rigid screen as the modular element on the foldable cart frame.

Figure 6:
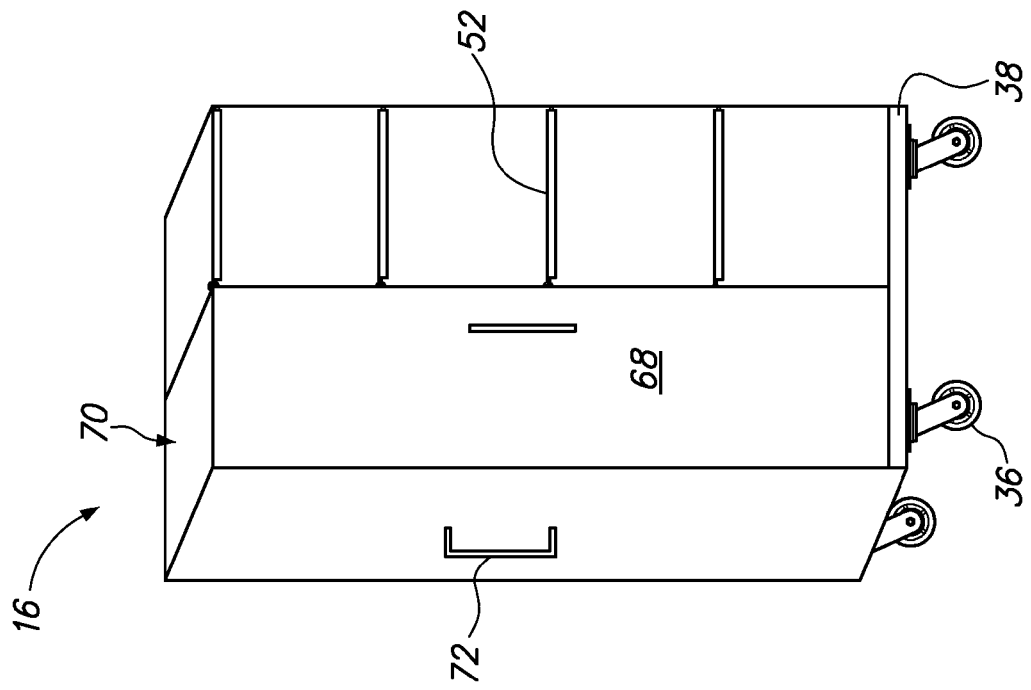

FIG. 6 presents a third illustrative closet cart module with at least one sliding door.

Figure 7:
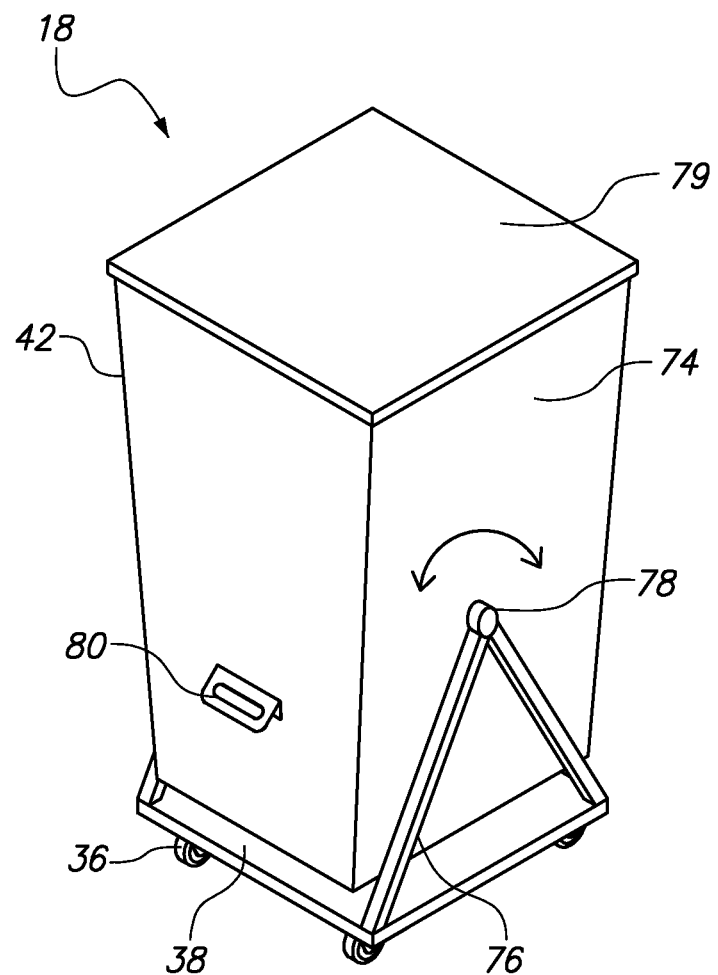

FIG. 7 presents an isometric view of another illustrative laundry cart module.

FIG. 8 shows a seated motorized customizable cart that includes a closet cart and laundry cart.

FIGS. 9 and 10 present partial views of motorized customizable cart with a stand for the driver.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus and systems described herein may vary as to configuration and as to details. Additionally, the methods may vary as to details, order of the actions, or other variations without departing from the illustrative method disclosed herein.

A customizable cart that can be used for a variety of different purposes is described herein. The customizable cart is configured to receive modular elements that changes the function of cart, thus the cart can serve many purposes. In the illustrative embodiments presented herein, the customizable cart can be used as a utility cart, a laundry cart, and a housekeeping cart.

The customizable housekeeping cart may be utilized as a laundry cart, a linen cart that includes clean linens and towels, and a "replacement" cart that includes toiletries, coffee, and other consumable items. The customizable cart may include a variety of different shelf configurations that are built into the cart for holding various items.

Additionally, multiple embodiments of the illustrative housekeeping cart are presented showing that the housekeeping cart can be further modified according to the particular function performed by its user. The need to modify the housekeeping cart may be based on optimizing the time and tasks completed by housekeeping staff. The optimization processes may be performed by Enterprise Resource Planning software systems and tools that optimize the workflow for the illustrative housekeeping staff.

The customizable housekeeping cart described herein overcomes the limitations of a typical housekeeping cart, including the need for different housekeeping carts needed for the servicing an area. Additionally, the customizable cart described herein overcomes the limitations associated with the weight of housekeeping cart filled with linens and towels, trash and replaced consumable, which is heavy and makes the housekeeping cart progressively more difficult to push and to steer, i.e. control.

Figure 1:
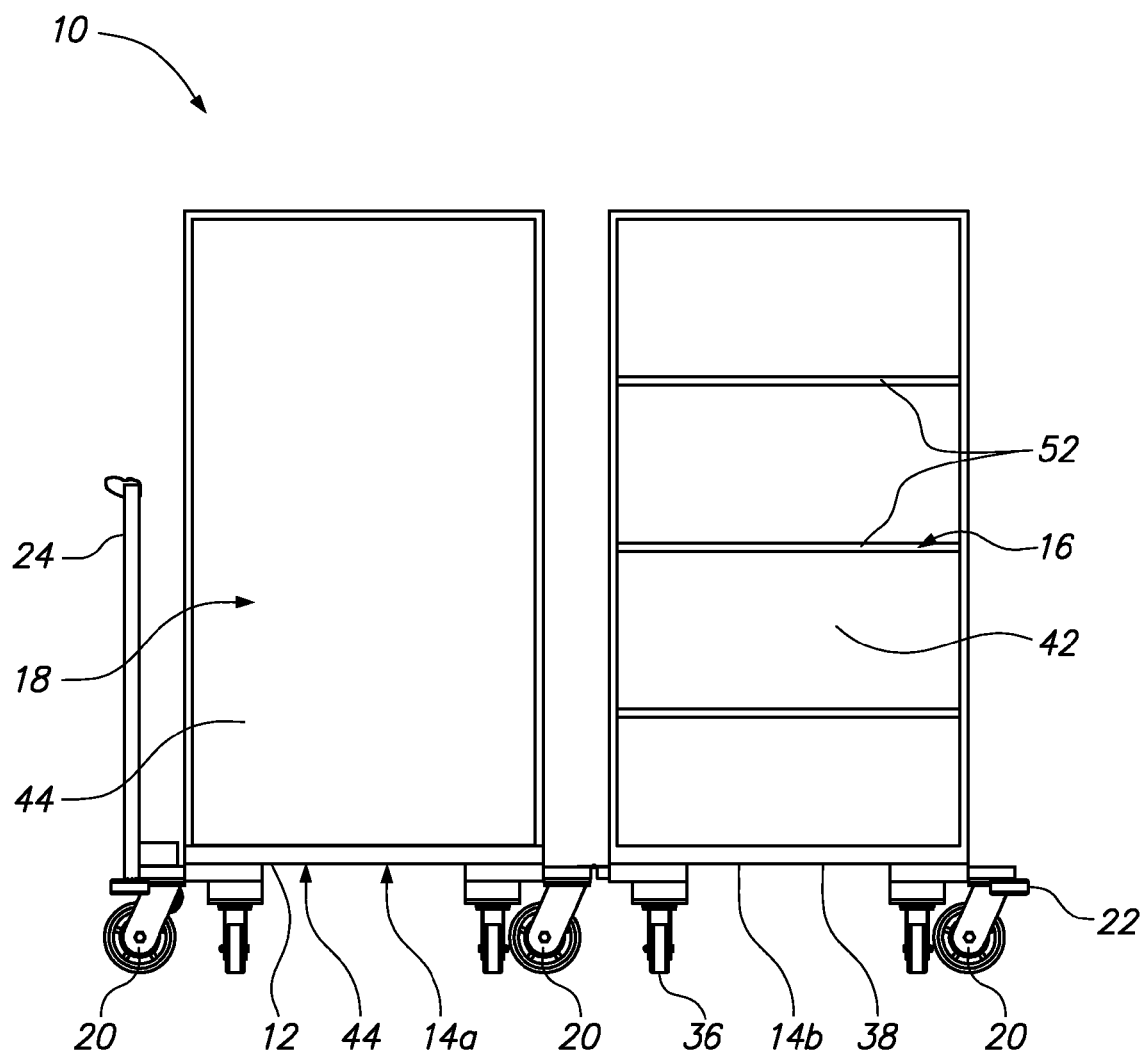

Referring to FIG. 1, there is shown an illustrative modular customizable cart with a laundry cart module and a first illustrative closet cart module with multiple shelves. The illustrative customizable cart 10 includes a "main" or "multipurpose" frame 12 having at least two bays 14 for a first modular cart frame, and a second modular cart frame. In the illustrative embodiment, both of the bays 14a and 14b receive modular cart frames such as closet carts 16 and laundry cart 18.

Figure 2:
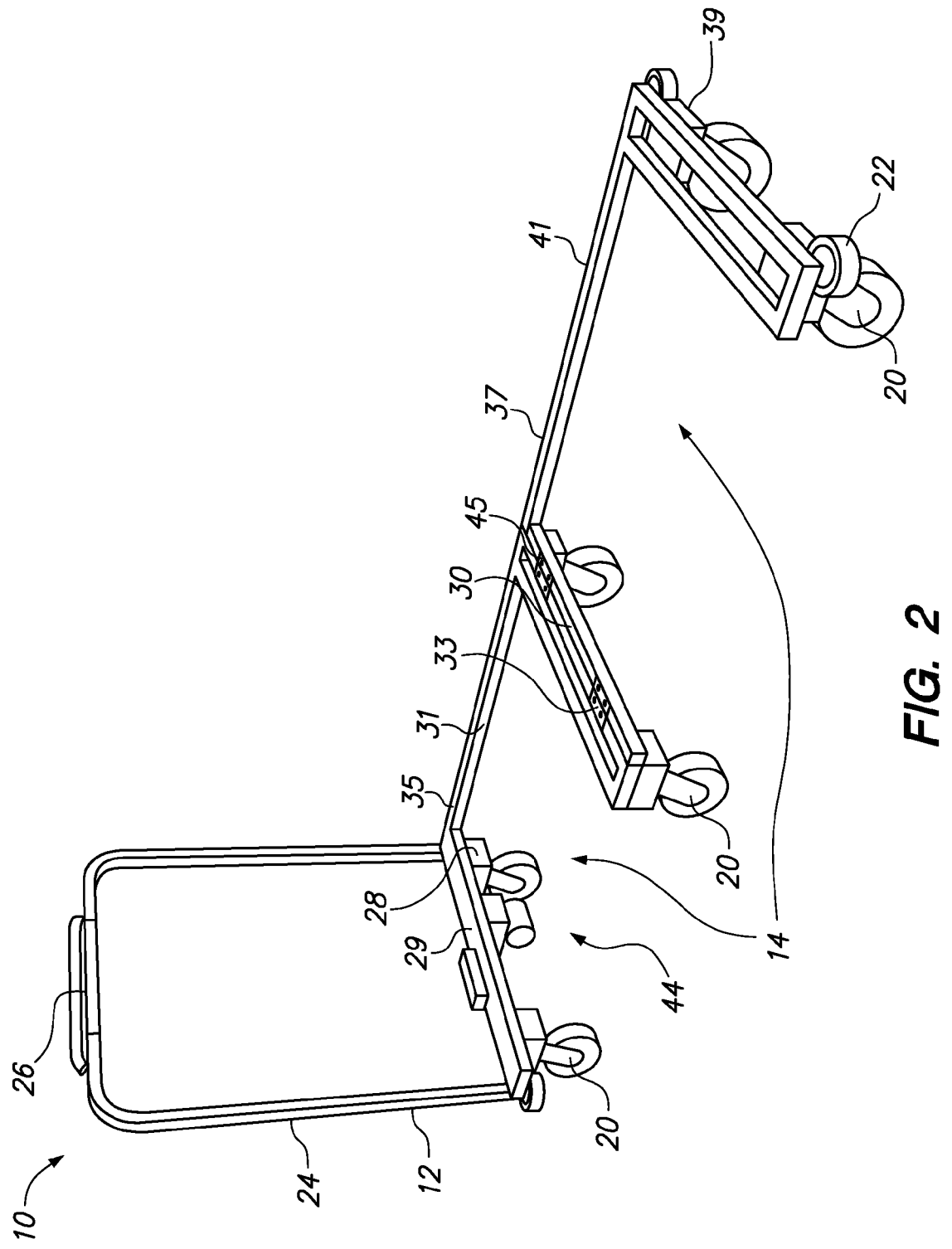

Referring to FIG. 2, there is shown an isometric view of a foldable main cart frame 12 without any modular elements. More particularly, the foldable main cart frame 12 slidably interfaces with the illustrative first and second modular cart frames.

The multipurpose frame 12 may include a plurality of cart frame casters 20 fixedly coupled thereto. For example, as shown in FIG. 2, the multipurpose frame 12 may include at least one pair of cart frame casters 20 flanking each bay 14.

Optionally, in some embodiments, at least one set of cart frame casters 20 may be motorized. In a motorized embodiment, the main cart includes a motor configured to power the modular cart and an illustrate rechargeable battery power source.

Additionally, casters or wheels 22 may be coupled to the multipurpose frame 12 such that the wheels connect with a surface perpendicular to the floor. For example, the wheels 22 may be placed at the front and rear corners of the multipurpose frame 12. These wheels 22 may help to deflect any impact between the multipurpose frame 12 and a wall (not shown). The wheels 22 may also help in guiding and steering and the multipurpose frame 12 along a wall or pathway.

The multipurpose frame 12 may also include having a steerable member or handle 24. In some embodiments, the steerable member or handle 24 may include controls and a control box 26 for controlling a motor 28 configured to turn at least one set of cart frame casters 20. The control box 26 may also include a touchscreen display for the controls, and the control box 26 may also be communicatively coupled to a server via a wireless WiFi, 3G, 4G or other such wireless connection. A battery pack (not shown) and the motor 28 may also be coupled to the multipurpose frame 12. In some embodiments, the battery pack may include a rechargeable battery.

In some embodiments, the number of bays 14 on the multipurpose frame 12 may be customizable. For example, each of the at least two bays 14 may comprise a coupling means 30 that enables each of the at least two bays 14 to be removably coupled to the handle 24 and the illustrative bays 14. Additionally, there may a single bay embodiment where the coupling means enables one of the bays to be removed and only one modular component is received by the main cart frame 12.

The main cart 12 also includes a handle end 24 with a first base component 29 that is mechanically coupled to at least one caster as described above. The main cart 12 also includes a first bar 31 disposed on a distal end of the first base component 29 that extends to a second base component 33; in which the first bar 31 is orthogonal to the second base component 33 and the first base component 29.

A first bay perimeter 35 is bounded by the first base component 29, the first bar 31 and the second base component 33. In the illustrative customizable cart 10, the main cart 12 also includes a second bar 37 disposed on a distal end of the second base component 33 that extends to a third base component 39; in which the second bar 37 is orthogonal to the second base component 33 and the third base component 39. A second bay perimeter 41 is bounded by the second base component 33, the second bar 37 and the third base component 39.

Although the first bay perimeter 35 and the second bay perimeter 41 face in the same direction, an alternative embodiment (not shown) would provide for the first bay perimeter 35 to face in one direction and the second bay perimeter 41 to face an opposite direction.

The illustrative first bay perimeter 35 and second bay perimeter 41 are configured to slidably interface with a first modular cart frame and a second modular cart frame, respectively. As described herein, each modular cart frame has a plurality of casters that enable each modular cart frame to be rolled along a floor or carpet independently of the main cart 12.

Figure 3:
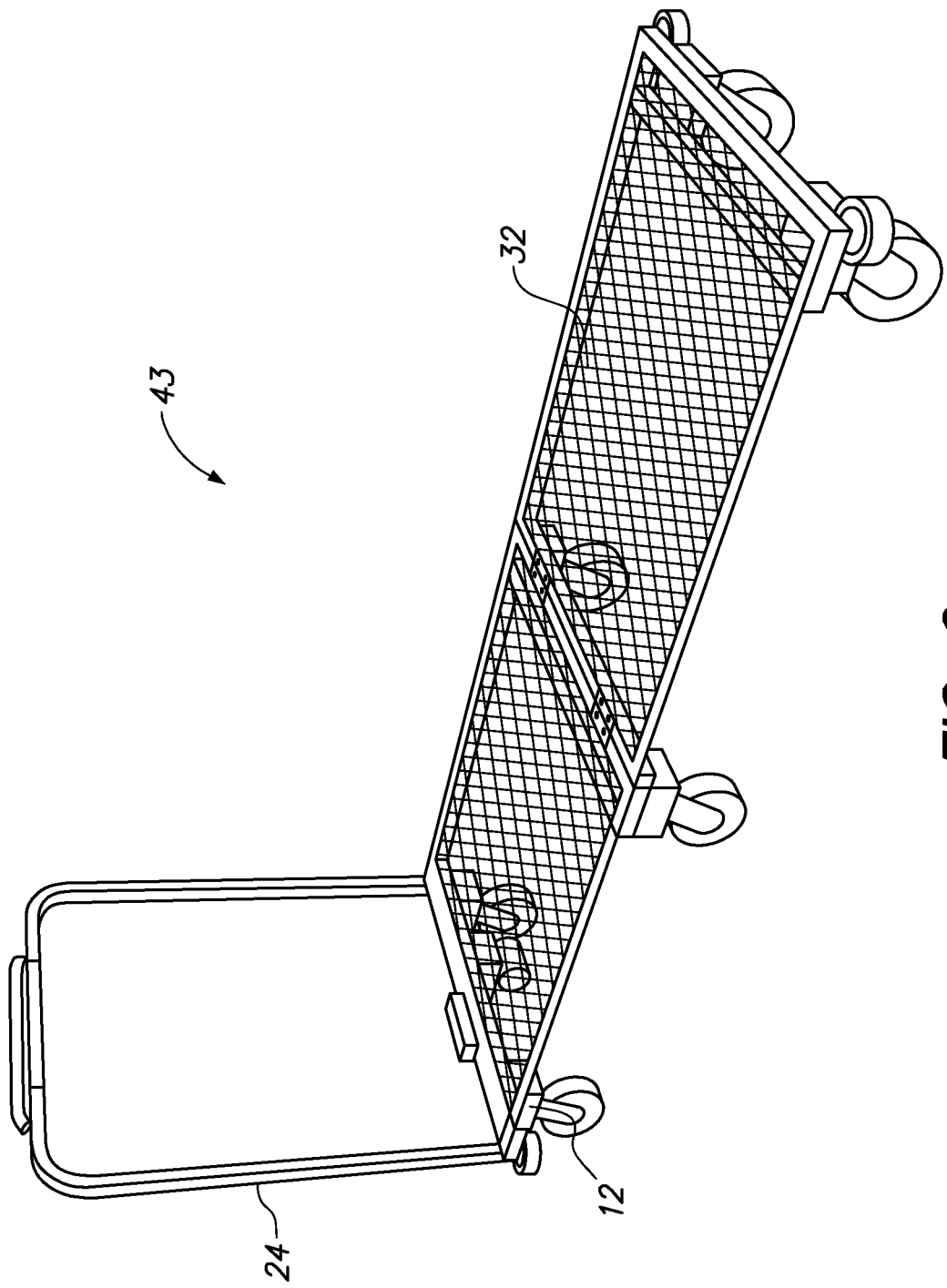

Referring to FIG. 3, there is shown an isometric view of an illustrative utility cart embodiment that includes a rigid screen as the modular element on the foldable cart frame. Utility carts are used to transport goods and they may be configured to carry containers, boxes, collect garbage, and other such tasks.

In the illustrative utility cart embodiment 43, the main cart is configured to receive a rigid material such as a metallic screen. The rigid material may be a single foldable screen or it may be two separate screens. The illustrative metallic screen is supported by bars, base components, or any combination thereof. By placing the screen 32 over the at least two bays 14, the multipurpose frame 12 may be used, for example, as a dolly for transporting large items.

Figure 4:
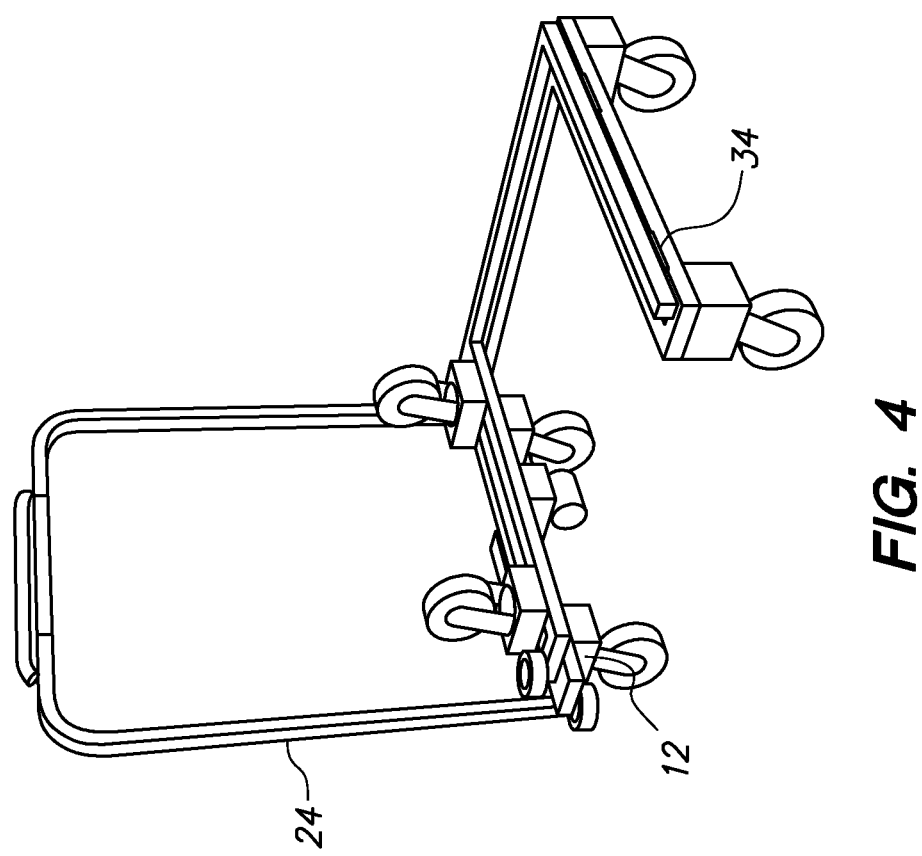
FIG. 4 shows the illustrative mother cart frame FIG. 2 in a folded configuration.

Referring to FIG. 4, there is shown the illustrative mother cart frame FIG. 2 in a folded configuration. In the illustrative embodiment, the two bays 14*a* and 14*b* may be coupled using a hinge 34. At least one of the at least two bays 14 may be folded onto another of the at least two bays 14 at the hinge 34, as illustrated in FIG. 4. By folding one of the at least two bays 14 onto another of the at least two bays 14, the multipurpose frame 12 may be made more compact, thus, facilitating storage of the multipurpose frame 12.

Alternatively, the illustrative main cart also includes a pivoting mechanism 45 (shown in FIG. 2) such a rod or shaft, which is disposed on the second base component 33 that enables the second bar 37 and the third base component 39 to rotate, so that the second bar 37 and third base component 39 can be folded over so that the first base component 31 is adjacent to the third base component 39.

Referring back to FIG. 1, the two bays 14 of the illustrative main cart frame 12 may be configured to receive a closet cart 16, a laundry cart 18, or any combination thereof. As illustrated in FIG. 1, the customizable cart 10 may include a closet cart 16 and a laundry cart 18. In another embodiment, the customizable cart 10 may include two closet carts 16, and, in a further embodiment, the customizable cart 10 may include two laundry carts 18.

In the illustrative embodiment, the closet cart 16 and the laundry cart 18 include a plurality of casters 36 coupled thereto. The plurality of casters 36 coupled to the closet cart 16 and the laundry cart 18 may be smaller than the cart frame casters 20 attached to the multipurpose frame 12. For example, in one embodiment, the plurality of casters 36 coupled to the closet cart 16 and the laundry cart 18 may be about 4 inches in diameter, and the cart frame casters 20 attached to the multipurpose frame 12 may be about 6 inches in diameter. In some embodiments, the plurality of casters 36 coupled to the closet cart 16 and the laundry cart 18 may be coupled to a rectangular frame or base 38, and the rectangular base 38 may be configured to receive either a closet receptacle 42 or a laundry receptacle 44. The rectangular base 38 may include a caster 36 at each corner.

The closet cart 16 and the laundry cart 18 may slidably interface with the at least two bays 14. For example, each of the at least two bays 14 may include an opening 46 along a length customizable cart 10. Each of the closet cart 16 and the laundry cart 18 may be slid into the opening 46. As the cart 10 is pushed or pulled with the handle 24, the closet cart 16 and the laundry cart 18 will be pushed or pulled by the multipurpose frame 12 surrounding the at least two bays 14.

Figure 5:
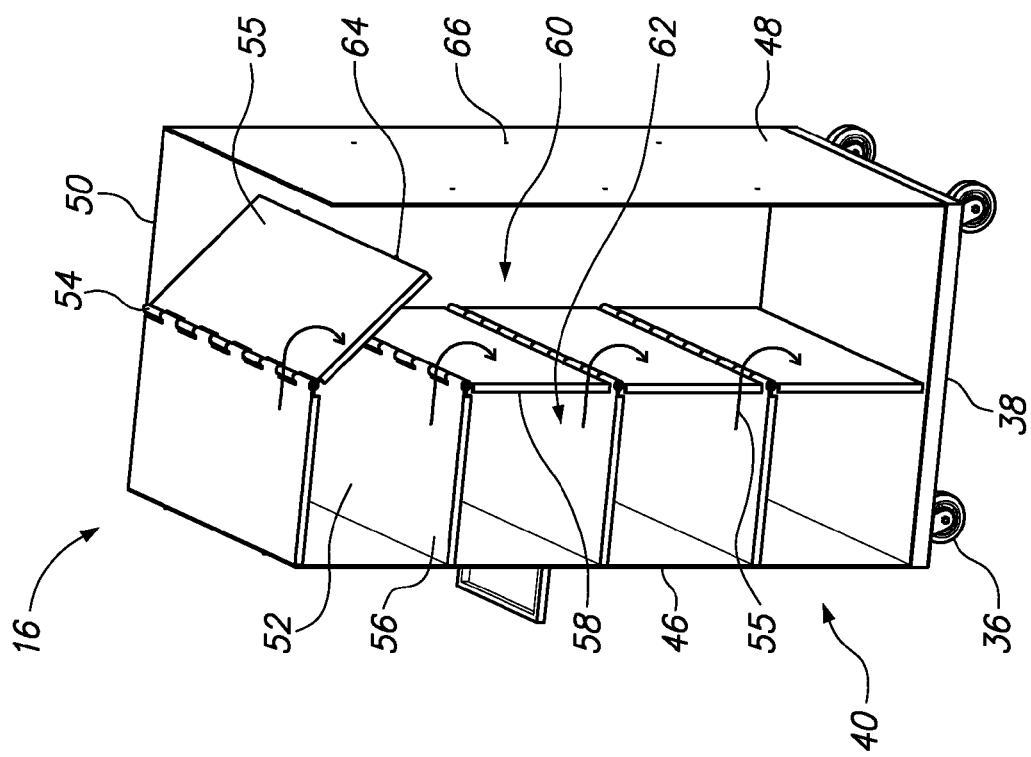
FIG. 5 shows a second illustrative closet cart module having collapsible shelves.

Referring to FIG. 5 there is shown a second illustrative closet cart module having collapsible shelves. The illustrative closet cart 16 includes at least three vertical walls such as a first wall 46, a second wall 48, and a foldable wall 58. In some embodiments, a fourth side opposite the rear wall 58 of the closet cart 16 may be open so that an interior of the closet cart 16 may be accessible.

As shown in FIG. 5, the closet cart 16 may include a plurality of shelves 52. The shelves 52 of the closet cart 16 may be used to hold and organize traditional housekeeping materials including, for example, toiletries, towels, and bed linens. The plurality of shelves 52 may be adjusted to a desired height for each of the plurality of shelves 52. In some embodiments, the plurality of shelves 52 may be a solid planar shelf material, as illustrated in FIG. 1.

Alternatively, at least one of the shelves 52 may include an articulating shelf component, as illustrated in FIG. 5. For example, as shown in FIG. 5, the shelf 52 may comprise a joint or hinge 54 located along the length of the shelf. The shelf 52 may bend at the hinge or pivoting means thereby shortening the length of a horizontal portion 55 of the shelf 52 and forming a vertical portion 56 of the shelf extending between the shelf 52 and a lower shelf. When a plurality of the shelves 52 are bent at the hinge 54, a shelfless compartment 60 may be formed on one side of the closet cart 16 and a shelved compartment 62 on the other side of the closet cart 16.

Furthermore, at least one end of the plurality of shelves 52 may comprise a means for removably coupling the shelf 52 to the first wall 46 or the second wall 48 of the closet cart 16. For example, at least one end of the shelf 52 may comprise at least one spring pin 64 and the second wall 48 of the closet cart 16 may comprise at least one recess 66 configured to receive the at least one spring pin 64.

The illustrate closet cart module may include supplies that are used to clean multiple rooms, clean towels, clean linens, amenities such as soaps and shampoos, and a trash bag used to collect waste from the waste baskets. In FIG. 5, the closet module cart frame includes a plurality of shelves and at least one of the shelves includes an articulating shelf. Additionally, the shelves may be configured to be removable and may include at least one slidable door.

Referring now to FIG. 6 there is shown an illustrative closet cart module with at least one sliding door. For example, the illustrative closet cart 16 includes at least one panel or door 68. The at least one door 68 may be configured to slide horizontally from one side of the closet cart 16 to another side of the closet cart 16. In one embodiment, the door 68 may be positioned over the shelfless compartment 60 thereby forming a receptacle 70. The receptacle 70 could be used, for example, to hold larger items such as clean linens or, alternatively, as space to collect soiled linens. Additionally, as shown in FIGS. 5 and 6, the closet cart 16 may include at least one handle 72 for steering the closet cart 16.

Referring to FIG. 7 there is shown an isometric view of an illustrative laundry cart module. The illustrative laundry cart 18 includes a receptacle 74 configured to receive, for example, soiled linens and towels (not shown). For example, the receptacle includes a linen bag suspended within the handles of the carts, and the housekeeper places the dirty linens in the linen bag, which is also referred to as "receptacle." The receptacle 74 may be formed of a pliable material such as, for example, cloth or polyester. The receptacle 74 may be directly coupled to the rectangular frame or base 38.

Alternatively, as shown in FIG. 7, the receptacle 74 may be coupled to an angular brace 76 which is coupled to the rectangular frame. The receptacle 74 may be coupled to the angular brace 76 at a hinge or pivot point 78. The receptacle 74 may be moved from a vertical to a horizontal position about the hinge or pivot point 78 in order to facilitate the removal of the receptacle's 74 contents. The laundry cart may also include a handle 80 coupled to the receptacle 74 to aid maneuvering of the laundry cart 18. Optionally, the laundry cart 18 may also include a lid 79 for enclosing the receptacle 74.

Referring to FIG. 8 shown a seated motorized customizable cart that includes a closet cart and laundry cart. FIGS. 9 and 10 present partial views of motorized customizable cart with a stand for the driver. More particularly FIGS. 8-10 illustrate additional embodiments of a customizable cart 10', 10" that include a support 82, 86 for the operator 84 and a steerable shaft 88.

As shown in FIG. 8, the customizable cart 10' may include a seat 82 for an operator 84 of the customizable cart 10'. In FIGS. 9 and 10, the customizable cart 10" may include an operator support plate 86 on which the operator 84 may stand while operating the customizable cart 10". For example, the operator 84 may choose to not stand on the support plate 86 but rather walk behind the steerable shaft 88 as shown in FIG. 10. In FIGS. 8-10, a caster 90 may be included under the seat 82 or operator support plate 86 to support the weight of the operator 84. The caster 90 may be larger than the other cart frame casters 20 and 36 on the customizable cart 10. In one illustrative embodiment the caster 90 may be about 8 inches in diameter. The seat 82 and support plate 86, combined with the motor 28 (shown in FIG. 2) make it possible for the operator 84 to operate the customizable cart 10 of the present invention regardless of the weight of the customizable cart 10.

Additionally, the closet cart 16 (shown in FIG. 5) and the laundry cart 18 (shown in FIG. 7) may be sized to fit within a typical closet. For example, each of the closet cart 16 and the laundry cart 18 may have a width of about 1 foot to about 4 feet and a length of about 1 foot to about 4 feet. The closet cart 16 and the laundry cart 18 may have a height to meet the needs of the particular use. In some embodiments, the closet cart 16 and the laundry cart 18 may be sized to reach an average waist or chest height. For example, in one embodiment, the closet cart 16 and the laundry cart 18 may be between about 2 feet and about 5 feet in height. The customizable cart 10' may be formed of a rigid material. In one embodiment, the customizable cart 10' may be formed of an aluminum material.

The illustrative customizable cart 10 of the can be used in any hospitality setting such as hotels, condominiums, and casinos. For example, in a hotel, a housekeeper may have a closet cart or a laundry cart which he or she is responsible for moving from each individual room. The main cart frame may then be separated from the closet cart and laundry cart so that another housekeeping staff person can obtain more closet carts or the laundry carts and strategically place them in specific rooms.

For example, by using the closet cart 16 (shown in FIG. 5) and the laundry cart 18 (FIG. 7) that slidably interface with the main cart 12 (shown in FIG. 1), a floor assistant may be charged with setting up each room for cleaning by leaving at least one of the closet cart 16 and the laundry cart 18 in at least one strategically located room closet. The housekeeper may then access the closet cart 16 and the laundry cart 18 in the room closet quickly and efficiently without having to continually return to and move a cart from room to room.

The customizable cart 10 also allows an operator to customize the cart 10 based on the needs and demands of their establishment. For example, the combinations of closet carts 16 (FIG. 5) and laundry carts 18 (FIG. 7) may be determined by the time of day, day of week, and time of year, such as a holiday. More specifically, Sunday and Monday are typically "heavy" days when a lot of laundry is generated, so the customizable cart 10 may be customized to include more laundry carts 18 to remove the excess soiled linens. After the soiled linens have been removed, then additional closet carts 16 can be set-up at optimal locations, so the closet cart 16 can be stored in a closet, by a floor assistant for example, and a housekeeper can then access the closet cart 16 from the closet and then remove the materials stored in the closet cart 16.

In some embodiments, an Enterprise Resource Planning (ERP) software application may help guide the determination of the optimal location for the closet carts 16 and laundry carts 18. The floor assistant may then load the customizable cart 10 of the present invention with the appropriate combination of closet carts 16 and laundry carts 18. The floor assistant may then place the closet carts 16 and the laundry carts 18 in the appropriate rooms, which may be identified by the ERP software for access by the housekeepers.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A modular housekeeping cart comprising:
  a main cart frame that includes,
    a handle end with a first base component that is mechanically coupled to at least one caster,
    a first bar disposed on a distal end of the first base component that extends to a second base component, wherein the first bar is orthogonal to the second base component and the first base component,
    wherein a first bay perimeter includes the first base component, the first bar and the second base component,
    a second bar disposed on a distal end of the second base component that extends to a third base component, wherein the second bar is orthogonal to the second base component and the third base component,
    wherein a second bay perimeter includes the second base component, the second bar and the third base component,
    a pivot disposed on the second base component that enables the second bar and the third base component to rotate, so that the second bar and third base component can be folded over so that the first base component can interface with the third base component;
a first modular laundry cart frame having a plurality of first casters disposed on a first modular cart frame base, the first modular laundry cart frame configured to slidably interface with the main cart frame at the first bay, the first modular laundry cart frame including,
a receptacle configured to receive contents,
an angular brace coupled to the receptacle at a pivot point, wherein the receptacle may be moved from a vertical to a horizontal position about the pivot point in order to facilitate removal of contents from the receptacle;
a second modular closet cart frame having a plurality of second casters on a second modular cart frame base, the second modular laundry cart frame configured to slidably interface with the main cart frame at the second bay, the second modular closet cart frame includes,
a plurality of articulating shelves that each have a hinge that shortens a shelf length,
a shelfless compartment formed when the shelves are bent at the hinge,
a slidable door configured to be positioned over the shelfless compartment to form a second receptacle; and
a motor configured to power the main cart frame, the first modular laundry cart frame and the second modular closet cart frame.

2. The modular cart of claim 1, further comprising a steerable shaft and a support plate.

3. The modular cart of claim 1 wherein at least one modular cart frame further comprises a bag.

4. The modular cart of claim 1, wherein at least one of the plurality of shelves is configured to be removable.

5. The modular cart of claim 1 wherein the first modular laundry cart frame further comprises a first bag and the second modular closet cart frame further comprises a second bag.

6. The modular cart of claim 1, wherein the motor is coupled to the first base component.

7. The modular cart of claim 1, further comprising a steerable shaft and an operator seat.

8. A housekeeping cart system comprising:
a multipurpose cart frame that includes at least two bays, wherein the multipurpose cart frame is fixedly coupled to a plurality of cart frame casters, the multipurpose cart frame includes,
a pivot that enables the multipurpose cart frame to fold over so that one bay folds over another bay;
a motor configured to power the multipurpose cart frame, a closet cart and a laundry cart;
at least one cart removably coupled to the multipurpose frame, the at least one cart including at least one of the laundry cart and the closet cart;
wherein the closet cart includes,
a first base that is fixedly coupled to a first plurality of casters,
a plurality of articulating shelves that each have a hinge that shortens a shelf length,
a shelfless compartment formed when the plurality of articulating shelves are bent at the hinge,
a slidable door configured to be positioned over the shelfless compartment to form a second receptacle; and
wherein the laundry cart includes,
a second base that is fixedly coupled to a second plurality of casters,
a receptacle configured to receive contents,
an angular brace coupled to the receptacle at a pivot point, wherein the receptacle may be moved from a vertical to a horizontal position about the pivot point in order to facilitate removal of contents from the receptacle.

9. The cart system of claim 8, wherein the at least one cart removably coupled to the multipurpose frame comprises at least two closet carts.

10. The cart system of claim 8, wherein the at least one cart removably coupled to the multipurpose frame comprises at least two laundry containers.

11. The cart system of claim 8, wherein the multipurpose cart frame includes a steerable shaft and a support plate.

12. The cart system of claim 8, wherein the multipurpose cart includes a steerable shaft and a seat.

13. A method of forming a customizable housekeeping cart system comprising:
selecting at least one of a closet cart and a laundry cart wherein,
the closet cart includes,
a first base that is fixedly coupled to a first plurality of casters,
a plurality of articulating shelves that each have a hinge that shortens a shelf length,
a shelfless compartment formed when the plurality of articulating shelves are bent at the hinge,
a slidable door configured to be positioned over the shelfless compartment to form a second receptacle; and
the laundry cart includes,
a laundry receptacle fixedly coupled to a second base that is fixedly coupled to a second plurality of casters,
an angular brace coupled to the receptacle at a pivot point, wherein the receptacle may be moved from a vertical to a horizontal position about the pivot point in order to facilitate removal of contents from the receptacle; and
coupling the at least one closet cart and laundry cart to a multipurpose cart frame having a third plurality of casters and configured for receiving at least one of the at least one closet cart and laundry cart, wherein the multipurpose cart frame includes,
a pivot that enables the multipurpose to fold over so that one bay folds over another bay,
a motor configured to power the multipurpose cart frame, the closet cart and the laundry cart.

14. The method of claim 13, wherein selecting at least one of the closet cart and the laundry cart comprises selecting at least two closet carts.

15. The method of claim 13, wherein selecting at least one of the closet cart and the laundry cart comprises selecting at least two laundry carts.

16. The method of claim 13, wherein the multipurpose cart frame includes a steerable shaft and a support plate.

* * * * *